US006993679B2

(12) United States Patent
George

(10) Patent No.: US 6,993,679 B2
(45) Date of Patent: Jan. 31, 2006

(54) SYSTEM AND METHOD FOR INHIBITING READS TO NON-GUARANTEED DATA IN REMAPPED PORTIONS OF A STORAGE MEDIUM

(75) Inventor: Subin George, Broomfield, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 472 days.

(21) Appl. No.: 10/086,167

(22) Filed: Feb. 28, 2002

(65) Prior Publication Data

US 2003/0163756 A1    Aug. 28, 2003

(51) Int. Cl.
*G06F 11/00*    (2006.01)
(52) U.S. Cl. .................. 714/8; 714/710; 365/195
(58) Field of Classification Search ............. 714/8, 714/7, 710, 711; 365/191, 195, 200
See application file for complete search history.

(56) References Cited

U.S. PATENT DOCUMENTS

| | | | |
|---|---|---|---|
| 6,094,317 A | 7/2000 | Chung | |
| 6,239,931 B1 | 5/2001 | Chung et al. | |
| 6,263,459 B1 * | 7/2001 | Schibilla | 714/710 |
| 6,272,085 B1 * | 8/2001 | Maeda | 369/53.17 |
| 6,332,204 B1 | 12/2001 | Russell | |
| 6,384,999 B1 * | 5/2002 | Schibilla | 360/53 |
| 6,502,205 B1 * | 12/2002 | Yanai et al. | 714/7 |
| 2001/0010085 A1 | 7/2001 | Rafanello et al. | |
| 2003/0074523 A1 * | 4/2003 | Johnson | 711/112 |
| 2003/0156471 A1 * | 8/2003 | Ueda et al. | 365/200 |

FOREIGN PATENT DOCUMENTS

WO    WO0175879    * 10/2001

OTHER PUBLICATIONS

Radanello, et al., Filed on Mar. 1, 2001 as U.S. Appl. No. 09/798,864, 12 pages.
Gene Milligan, Seagate Technology, Inc., "Information Technology—SCSI-3 Block Commands (SBC)," dpANS NCITS 306-199X, T10, Project 996D, Revision 8c, Nov. 13, 1997, 125 pages.

* cited by examiner

*Primary Examiner*—Scott Baderman
*Assistant Examiner*—Paul Contino
(74) *Attorney, Agent, or Firm*—Robert C. Kowert; Meyertons, Hood, Kivlin, Kowert & Goetzel, P.C.

(57) ABSTRACT

Various embodiments of a method and system for inhibiting reads to non-guaranteed data in remapped portions of a storage medium are disclosed. In one embodiment, a method of managing a non-read list associated with a storage medium involves: detecting a bad portion of the storage medium, remapping the bad portion's address to a new portion of the storage medium, copying the data stored to the bad portion to the new portion and, if the copy is unsuccessful, adding the address of the new portion to the non-read list, and inhibiting a read to the new portion if the new portion's address is listed on the non-read list. The address of the new portion may be removed from the non-read list in response to a successful write to the new portion.

29 Claims, 6 Drawing Sheets

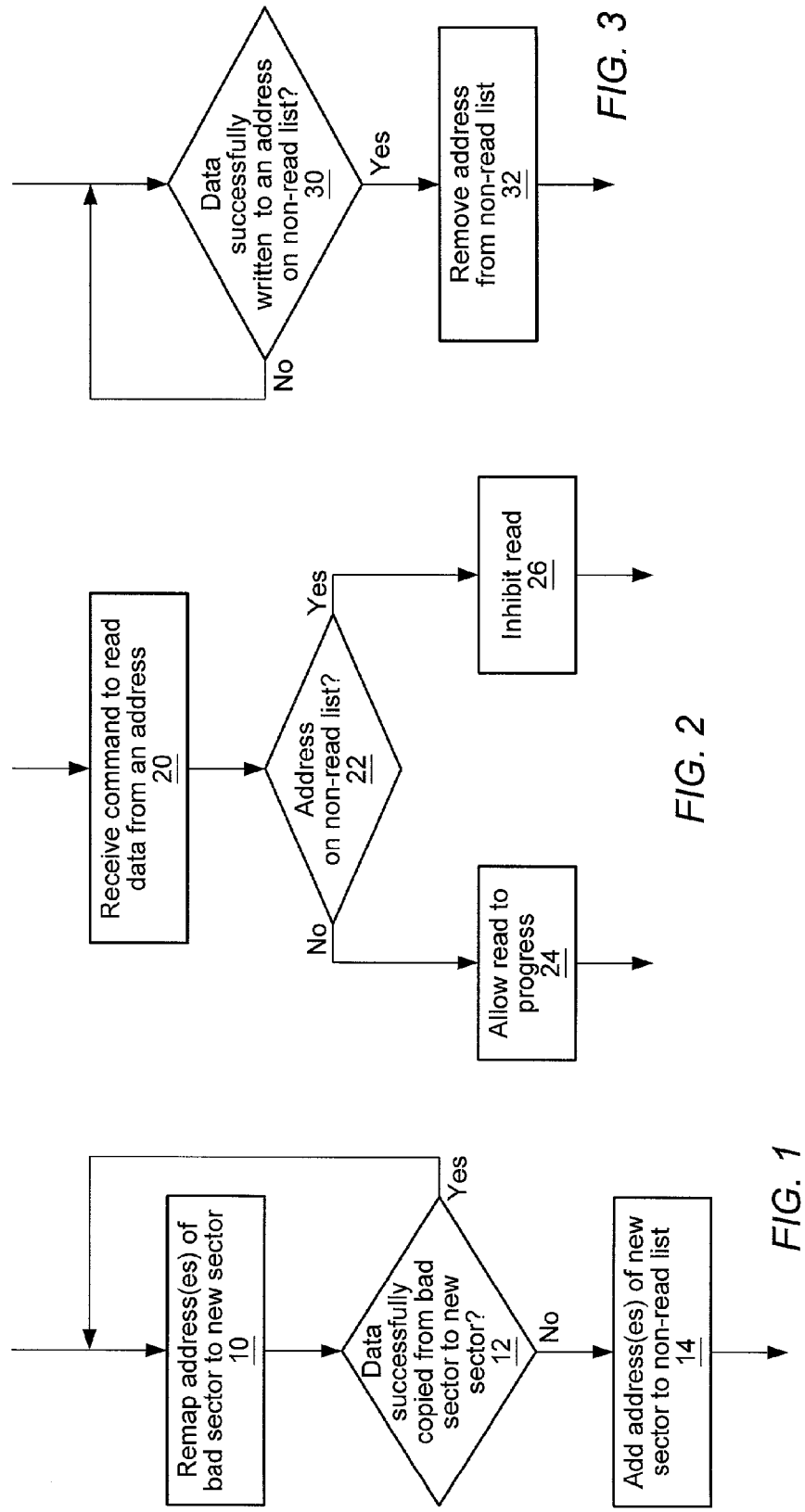

SYSTEM AND METHOD FOR INHIBITING READS TO NON-GUARANTEED DATA IN REMAPPED PORTIONS OF A STORAGE MEDIUM

BACKGROUND OF THE INVENTION

1. Field of the Invention

This invention relates to storage systems and, more particular, to managing remapped portions of a storage medium.

2. Description of the Related Art

The data-storing area of a typical hard drive platter is organized into several concentric rings, or tracks. Each track is subdivided into sectors. Sectors each store data (e.g., a multiple of 512 bytes of data) and/or housekeeping information. Each sector may include a header, data, and/or a trailer. The header may include a preamble that synchronizes read circuits to the data, an ID field that identifies the sector, flags used during defect management, and a checksum that validates and/or corrects the header. The data field may include a synchronizing field and a data area that stores user data. The trailer may contain checksum or error correction information, providing protection against data errors. Other storage media (e.g., optical storage media such as CDs (Compact Disks) and magneto-optical storage media) are also typically subdivided into similar data-storing portions.

Often, the representation of a storage medium at the operating system level is different from the actual physical configuration of that storage medium. For example, a storage medium may be represented as a list of logical block addresses at the operating system level. In contrast, the physical configuration of the storage medium may be significantly more complex. Hard disks, for example, may include several platters that are each subdivided into tracks, and different tracks may contain different numbers of sectors. Generally, a storage device's controller or device driver remaps the logical addresses used to specify data at the operating system level into the physical identifiers that locate the physical portion of the storage medium that stores the data.

A storage medium such as a hard disk may have or develop bad portions (e.g., sectors, tracks, etc.) that cannot reliably store data. In order to avoid using bad portions of the storage medium, bad sectors may be marked and remapped to other portions of the storage medium. This remapping may remap a logical address from the bad portion of the storage medium to a new portion of the storage medium. Because there is a tendency for bad portions of a storage medium to be spatially adjacent to each other, some storage device drivers and/or controllers may remap portions that surround a bad portion as a safety precaution. Bad portions of a storage medium that arise during manufacturing are normally detected, marked, and remapped by the manufacturer. Bad sectors that develop later in the storage device's lifetime may be detected during scans of the storage medium or when an error is detected during an access operation (e.g., a read or write). These bad portions may also be remapped to new portions by a device driver or device controller.

If a subsequent access operation specifies a bad portion of a storage medium (e.g., by specifying the logical address previously mapped to that portion), the drive controller or device driver may use mapping information to redirect the operation to the new portion to which the bad portion was mapped. In some hard drives, the mapping information for a particular sector may be stored in that sector's header information. Thus, the mapping information for a bad sector may not be available until the bad sector's header information has been read. In other drives, a defect mapping table or list that shows the mapping information for all or part of the drive may be stored in system memory or in the drive controller memory in order to avoid unnecessarily accessing the bad sector of the hard disk.

The storage device (or the storage device driver) may maintain one or more lists of defective sectors in order to avoid using those sectors. For example, if the storage device is a SCSI (Small Computer System Interface) hard drive, the manufacturer-created list of bad sectors is called the PLIST (Primary List). Other lists may include the CLIST (Certification List), which lists bad sectors discovered during a certification procedure, the DLIST (Data Defect List), and the GLIST (Grown List). Bad sectors added to the CLIST and/or the DLIST are added to the GLIST, which lists all defective sectors that have been detected (except those already included on the PLIST).

When a bad portion of a storage medium is detected and remapped, the data that was stored in that portion may be copied to a new portion. However, the data that the bad portion was storing may be corrupt. Thus, the data stored to the new portion may not be guaranteed to be correct.

SUMMARY

Various embodiments of a method and system for inhibiting reads to non-guaranteed data in remapped portions of a storage medium are disclosed. In one embodiment, a method of managing a non-read list associated with a storage medium involves: detecting a bad portion of the storage medium, remapping the bad portion's address to a new portion of the storage medium, copying the data stored to the bad portion to the new portion and, if the copy is unsuccessful, adding the address of the new portion to the non-read list, and inhibiting a read to the new portion if the new portion's address is listed on the non-read list. The address of the new portion may be removed from the non-read list in response to a successful write to the new portion.

In some embodiments, the storage medium may include one or more hard disk platters, and the new portion may be a sector on one of the hard disk platters.

In some embodiments, the new portion may be successfully written when data is restored to the new portion from a backup device. In some embodiments, performing a backup operation may involve determining whether any addresses of any portions of the storage medium are listed on the non-read list, and if the address of a portion of the storage medium is listed on the non-read list, restoring data from a backup device to that portion of the storage medium. Restoring data to the non-read-listed portion of the storage medium may remove the address of that portion from the non-read list.

In one embodiment, the storage medium may be included in a group of mirrored storage media (e.g., a pair of mirrored hard drives). If the address of a portion of the storage medium is listed on the non-read list, reads to that address on any of the storage devices in the group may be inhibited. Restoring data to the non-read-listed portion of the storage medium may involve restoring the data to each of the other mirrored storage media in the group.

In another embodiment, a storage device may include a storage medium that includes several portions, each identified by an address, an access mechanism configured to access data stored on the storage medium, and a controller coupled to control the access mechanism. The controller may be configured to receive a command to access data at a first address and to responsively control the access mechanism to access a first portion of the storage medium. The controller may be configured to inhibit read access to the first portion if the first portion's address is listed on a non-read list. The controller may also be configured to remove the first portion's address from the non-read list in response to a successful write to the first portion. In some embodiments, the non-read list may be stored on the storage medium.

The controller may be configured to list a second portion of the storage medium's address on the non-read list if a third portion of the storage medium is detected to be a bad portion, the third portion is remapped to the second portion, and data stored to the third portion is unsuccessfully copied to the second portion.

In some embodiments, a data processing system may include a host computer system including a memory and a processor and a storage array coupled to the host computer system. The storage array includes several storage devices, and a first storage device in the storage array has a non-read list. The data processing system also includes a controller coupled to manage the non-read list for the first storage device. An application program stored in the memory and executed by the processor may be configured to generate a read command to read data from a first portion of a storage medium included in the first storage device. If the address of the first portion is listed on the non-read list, the controller is configured to inhibit performance of the read command. The controller is configured to remove the address of the first portion from the non-read list in response to a successful write to the first portion.

In some embodiments, the controller may be included in a storage device controller included in the first storage device. In other embodiments, the controller may be included in an array controller coupled between the host computer system and the storage array. In yet other embodiments, the controller may be implemented in program instructions stored in the memory and executed by the processor.

BRIEF DESCRIPTION OF THE DRAWINGS

A better understanding of the present invention can be obtained when the following detailed description is considered in conjunction with the following drawings, in which:

FIG. 1 illustrates a flowchart of one embodiment of a method of adding addresses to a non-read list for a storage medium.

FIG. 2 is a flowchart showing one embodiment of a method of controlling read accesses to a storage medium that has a non-read list.

FIG. 3 shows a flowchart of one embodiment of method of managing a non-read list associated with a storage medium.

Figure 4:
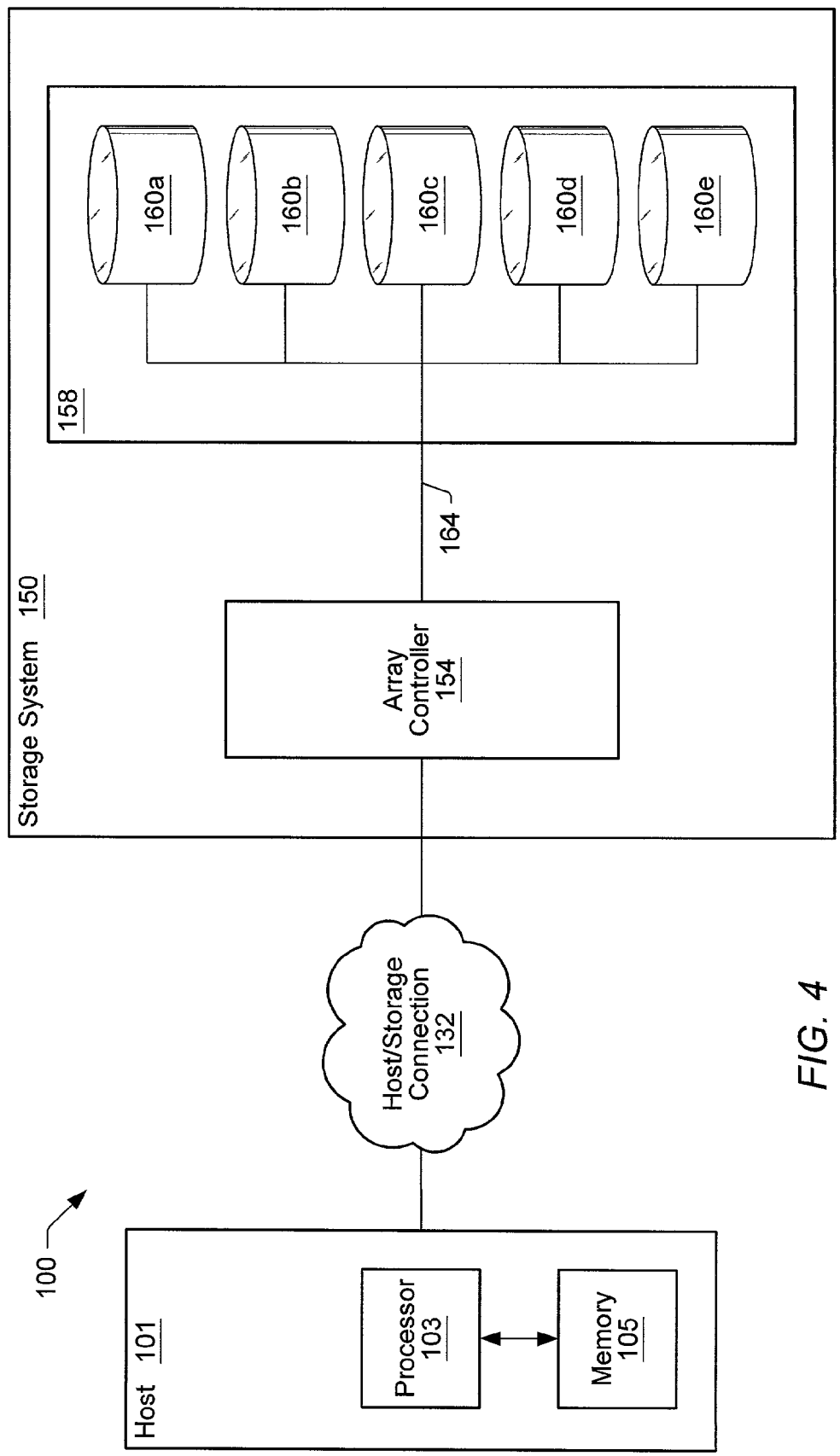
FIG. 4 is a block diagram of one embodiment of a data processing system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

A non-read list may be defined for a storage medium. In some embodiments, the non-read list may be stored on the storage medium and managed by the storage device's controller or device driver. For example, if the device is a SCSI device, management of the non-read list may be similar to management of the GLIST, PLIST, and/or CLIST, which list defective portions (e.g., sectors in of a hard disk) of the storage medium. When one or more address(es) (e.g., LBAs (Logical Block Addresses), CHS (Cylinder, Head, Sector) identifiers, etc.) that map to a bad physical portion of the storage medium are remapped to a new portion, the data stored in the bad portion is typically copied over to the new portion. However, situations often arise in which the data stored in the bad portion cannot be copied to the new portion or in which the data that is copied to the new portion cannot be guaranteed to be correct with a desired degree of certainty. For example, the data stored in a bad sector of a hard disk may be corrupted due to flaws in that portion of the storage medium. Even if error correcting check bits are stored with the data, the data may contain more errors than are correctable. If no error detection check bits are available, it may not be possible to verify that the data read from the bad sector is correct. If data cannot be copied to the new sector or cannot be guaranteed with a desired degree of certainty, the new portion may be listed on the non-read list. Reads to portions of the storage medium that are listed on the non-read list may be inhibited, preventing applications from accessing the potentially erroneous data. When a read to a non-read-listed portion of the storage medium is inhibited, an error indication may be returned to the application that initiated the read.

FIG. 1 shows one embodiment of a method of managing a storage device. At 10, one or more addresses may be remapped from a bad portion of the storage medium to a new portion. For example, if the storage device is a SCSI hard drive, the REASSIGN BLOCKS command may be used to remap one or more LBAs from a bad sector of a hard disk to a new sector. Depending on the amount of data stored in a sector and the logical block size being used, each sector may store one or more logical blocks (or, alternatively, a logical block may be stored in one or more sectors). Addresses may be remapped if certain amounts and/or types of errors are detected at a particular portion of the storage medium. Remapping may involve updating mapping information used to translate logical addresses, adding the bad portion to a defect list, updating header information in the bad portion, and/or updating a list of remapped portions to indicate the new mapping.

If the data stored in the bad portion of the storage medium is not successfully copied to the new portion, the address(es) for which data in the bad portion was not successfully copied to the new portion may be added to a non-read list, as shown at 12 and 14. Non-successful copies to a new portion may include any copy that does not guarantee a desired level of data correctness. Thus, non-successful copies may include both those in which data is known to be erroneous and those in which data is suspected to be incorrect. If the data is successfully copied to the new portion, the address is not added to the non-read list and normally processing may continue.

FIG. 2 shows one embodiment of a method of controlling access to a storage medium that has a non-read list. At 20, a command to read data, which is identified by an address that is mapped to one or more portions of the storage medium, is received. If the address is not on the non-read list, the read progresses normally, as shown at 22 and 24. However, if the read identifier is on the non-read list, the read is inhibited, as shown at 22 and 26. In addition to inhibiting the read, some embodiments may also return an error indication to the application that initiated the read, indicating that the address specified in the read command is listed on the non-read list. Reads to access data whose address is listed on the non-read list may be inhibited so that an application does not access (potentially) erroneous data.

FIG. 3 shows another embodiment of a method of controlling access to a storage medium that has a non-read list. Writes to addresses on the non-read list will be allowed. A successful write may clear an address from the non-read list, as shown at 30 and 32. For example, if a write operation writes an entire block of data to the address mapped to the new sector, and if the new sector stores a block of user data, a successful write indicates that the new data has overwritten the potentially erroneous data stored at the new sector. Consequentially, the data stored to the address may now be guaranteed to be correct, and removing the address from the non-read list allows read access to that address. Note that in some embodiments, more than one address may be mapped to a sector. Each address may be added to the non-read list when that address is remapped from the bad sector and each address may be individually removed from the non-read list in response to it being successfully written to. A write access that clears an address from the non-read list may be performed by restoring data from a backup copy, as will be described in more detail below.

FIG. 4 shows a functional block diagram of one embodiment of a data processing system 100, which includes a host 101 connected to a storage system 150 via host/storage connection 132. Host/storage connection 132 may be, for example, a local bus, a network connection, an interconnect fabric, or a communication channel. Storage system 150 may be a RAID storage subsystem or other type of storage array. In various embodiments, a plurality of hosts 101 may be in communication with storage system 150 via host/storage connection 132. In some embodiments, data processing system 100 may be configured as a SAN (Storage Area Network).

Contained within storage system 150 is a storage device array 158 that includes a plurality of storage devices 160a–160e (collectively referred to as storage devices 160). Storage devices 160a–160e may be, for example, magnetic hard disk drives, optical drives, magneto-optical drives, tape drives, solid state storage, or other non-volatile memory. As shown in FIG. 4, storage devices 160 are disk drives and storage device array 158 is a disk drive array. Although FIG. 4 shows a storage device array 158 having five storage devices 160a–160e, it is understood that the number of storage devices 160 in storage device array 158 may vary and is not limiting.

Storage system 150 may also include an array controller 154 connected to each storage device 160 in storage array 158 via one or more data paths 164. Data path 164 may provide communication between array controller 154 and storage devices 160 using various communication protocols, such as, for example, SCSI (Small Computer System Interface), FC (Fibre Channel), FC-AL (Fibre Channel Arbitrated Loop), or IDE/ATA (Integrated Drive Electronics/Advanced Technology Attachment), etc.

Array controller 154 may take many forms, depending on the design of storage system 150. In some systems, array controller 154 may only provide simple I/O connectivity between host 101 and storage devices 160 and the array management may be performed by host 101. In other embodiments of storage system 150, such as controller-based RAID systems, array controller 154 may also include a volume manger to provide volume management, data redundancy, and file management services. In other embodiments of the present invention, the volume manager may reside elsewhere in data processing system 100. For example, in software RAID systems, the volume manager may reside on host 101 and be implemented in software. In other embodiments, the volume manager may be implemented in firmware that resides in a dedicated controller card on host 101. In some embodiments, array controller 154 may be connected to one or more of the storage devices 160. In yet other embodiments, a plurality of array controllers 154 may be provided in storage system 150 to provide for redundancy and/or performance improvements.

In one embodiment, host 101 may manage storage system 150. A device driver running on host 101 may be configured to manage the non-read list in response to commands remapping addresses and accessing data or on one or more storage devices 160. In many embodiments, the device driver may manage a non-read list for each storage device 160 controlled by that device driver. The device driver may maintain one or more pointers (e.g., a head and a tail pointer) to the non-read list. Each non-read list may be stored on the storage device to which it corresponds. The device driver may be configured to add addresses to and remove address from the non-read list, e.g., as described with respect to FIGS. 1–3. The instructions that implement the device driver may be stored in memory 105 and executed by processor 103. Memory 105 may include random access memory (RAM) such as DRAM, SDRAM, DDR DRAM, RDRAM, etc. Note that in some embodiments, each non-read list may be managed by a controller in the storage device to which that non-read list corresponds. In some embodiments, each non-read list may be managed by the array controller.

In some embodiments, software for managing the non-read list(s) may be stored on another computer readable medium (e.g., a CD, DVD, hard disk, optical disk, tape device, floppy disk, etc.). In order for processor 103 to execute the instructions, the instructions may be loaded into system memory 105. In addition, the computer readable medium may be located in either a first computer, in which the software program is stored or executed, or in a second different computer, which connects to the first computer over a network such as the Internet. In the latter instance, the second computer may provide the program instructions to the first computer for execution. The instructions and/or data used to manage the non-read list(s) may also be transferred upon a carrier medium. In some embodiments, a computer readable medium may be a carrier medium such as a network and/or a wireless link upon which signals such as electrical, electromagnetic, or digital signals may be conveyed.

Figure 5:
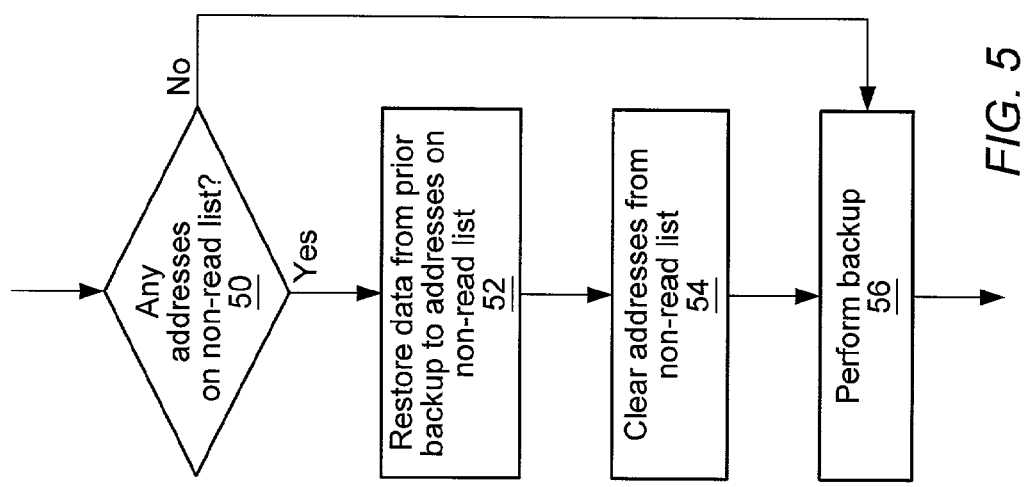
FIG. 5 illustrates one embodiment of a method of performing backups of a storage medium that has a non-read list.

FIG. 5 shows one embodiment of a method of performing a backup of a storage device that may have an associated non-read list. As shown at 50 and 52, if the storage device has any address listed on the non-read list, the backup mechanism may restore the data to the non-read-listed address before performing the backup. When the backup data is written to the non-read-listed address, those addresses are cleared from the non-read list, as shown at 54. The backup mechanism may then proceed with the backup, as indicated at 56. In some embodiments, the storage device(s) being backed up may be scanned for bad sectors before a backup is initiated in order to detect and remap bad sectors before the backup. If data in one of the remapped sectors is not guaranteed to be correct, the remapped sector's address may be added to a non-read list so that the data can be restored from a previous backup.

Note that in an alternative embodiment of a method of performing a backup, the backup procedure may progress normally, without first checking for the existence of any entries in the non-read list. If a read error is detected and the read error indicates that the address of the attempted read is on the non-read list, the backup may be paused and the data at that address may be restored (e.g., a system administrator may restore the data from another backup disk). Once the data has been restored and the address has been cleared from the non-read list, the backup may proceed.

In some embodiments, a backup procedure may be fully automated (e.g., the backup procedure may read the non-read list of a target storage device and automatically restore data to addresses listed on the non-read list before proceeding with the backup). Note that in other embodiments, however, a user may manually perform certain tasks during the backup procedure. For example, a user may check for non-read-listed addresses on a certain storage device or group of storage devices before initiating a backup procedure. Similarly, if the non-read list contains any addresses, the user may initiate a restore procedure to restore the data to those addresses from a backup. In many embodiments, the backup storage medium being used for the current backup may be a different medium than the one from which data at the non-read listed addresses is restored.

Figure 6:
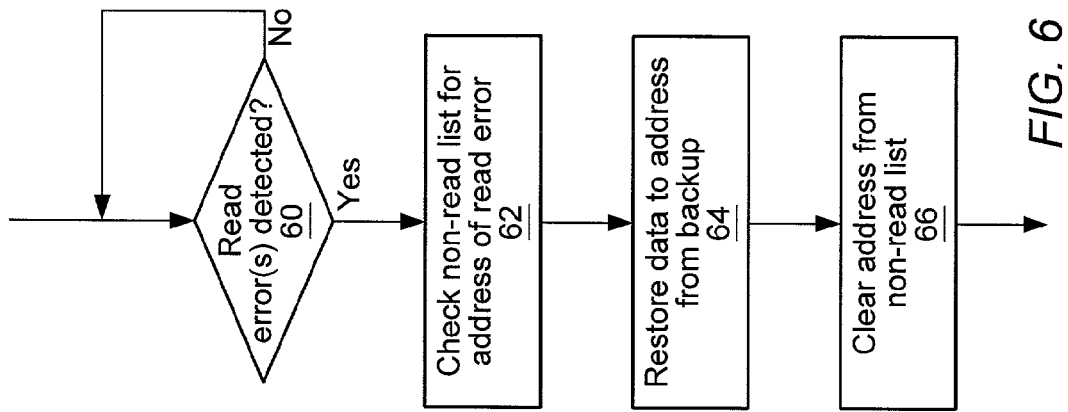
FIG. 6 shows a flowchart of one embodiment of a method of operating a data processing system that includes a storage medium with a non-read list.

FIG. 6 shows one embodiment of a method of managing a data processing system that includes one or more storage devices that have associated non-read lists. In this embodiment, read errors at one or more read addresses may be detected, as shown at 60. For example, a user running an application program may notify a system administrator of one or more read errors that generate a certain return value indicative of the address at the read error is detected. At 62, the non-read list may be checked (e.g., by a system administrator) for the address or addresses at which the read error(s) were detected. If the addresses are included on the non-read list, data at those addresses may be restored from a backup, as shown at 64. Restoring the data to the non-read-listed address(es) clears those addresses from the non-read list, as shown at 66. The method may be automated by the data processing system in some embodiments.

Returning to FIG. 4, note that in some embodiments, storage array 158 may be part of a mirrored system. For example, another storage array (not shown) may be configured as a mirror of storage array 158. Similarly, groups of storage devices within storage array 158 may be configured as mirrored systems. For example, storage devices 160a and 160b may be configured as a mirrored pair of disk drives. Generally, a mirrored system is one in which one or more storage devices or groups of storage devices are configured as mirrors of another group of storage devices. In some embodiments, mirroring may be performed in real-time. For example, a device driver running on host 101 may intercept accesses to storage device 160a and cause those accesses to be mirrored to device 160b. One problem that may arise due to real-time mirroring is that if data at a particular address is corrupted on the primary storage unit (e.g., storage device or group of storage devices), that corrupt data may be copied over to the other storage units in the mirrored system, overwriting the correct data stored to those units. When the sector to which the data is stored is subsequently remapped, both the primary storage unit and the other storage units in the mirrored system may be storing incorrect data. Accordingly, if the address is remapped, the data copied to the new sector (if any) may not be guaranteed to be correct and the address may be added to the primary storage unit's non-read list. Additionally, the data may not be copied from one of the other storage units in the mirrored system because those storage units' copies of the data may also be suspect.

Figure 7A:
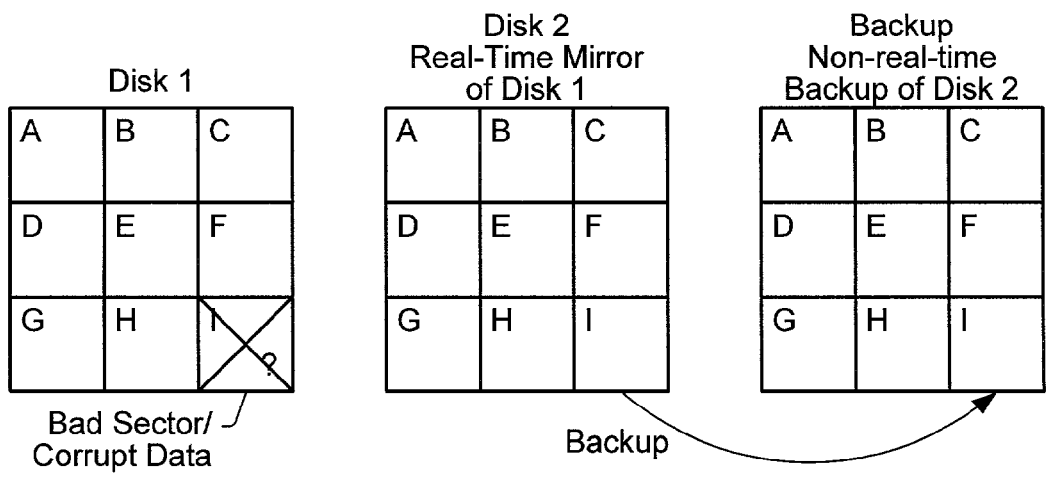
FIGS. 7A–7C shows one embodiment of a mirrored pair of disks and a backup device.
Figure 7B:
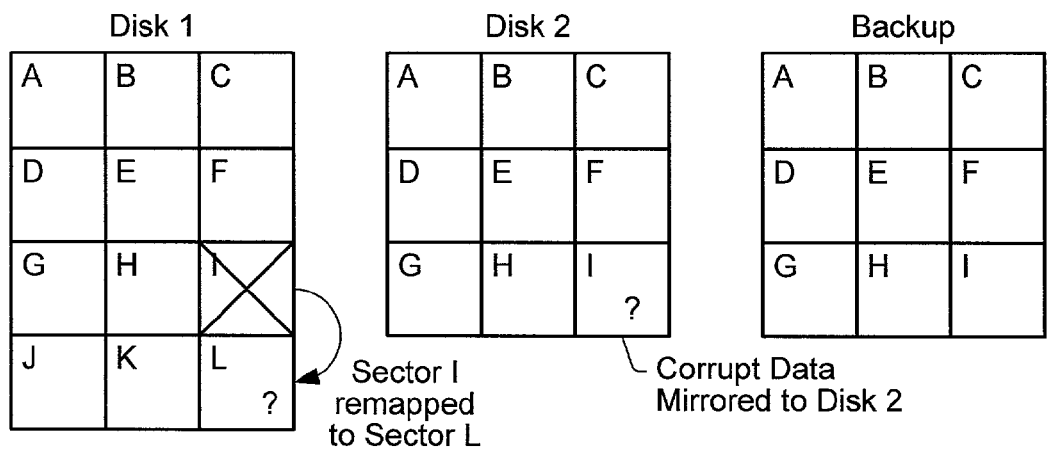
Figure 7C:
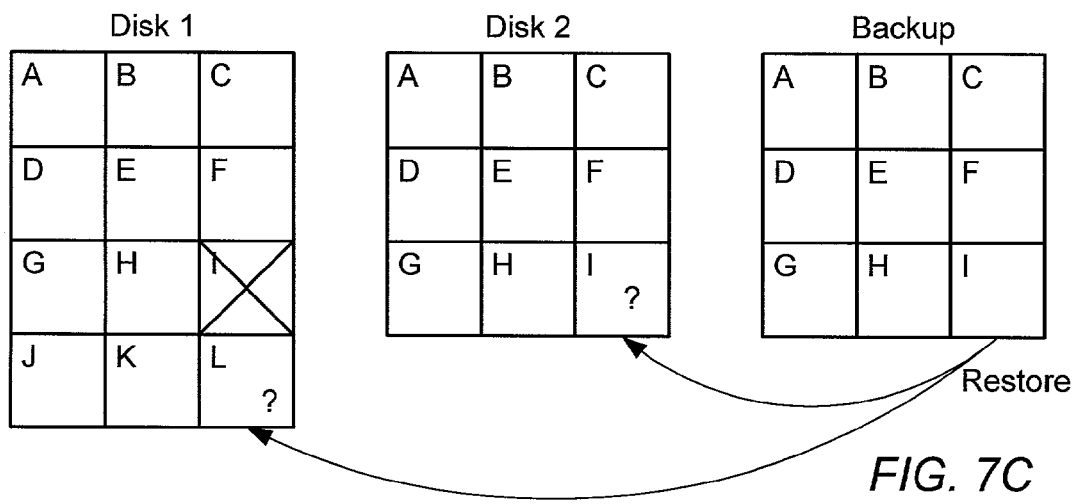

FIGS. 7A–7C show one example of one embodiment a mirrored pair of storage devices. FIGS. 7A–7C show disk 1, disk 2, and a non-real-time backup device. Disk 1 is the primary disk to which access operations (e.g., read and write) are typically directed. Disk 2 is configured as the real-time mirror of disk 1. In the illustrated embodiment, backups may copy data from disk 2 onto the backup device so as not to disrupt users' access to disk 1 during the backup. Note that in alternative embodiments, a backup procedure may copy data from disk 1 to the backup device.

Sectors A–I of each storage device are illustrated. Assuming each sector of each disk stores one block of data and that each address identifies one block, each address used to specify data on disk 1 and disk 2 maps to a respective sector on each disk. In this example, sector I is a bad sector on disk 1, as shown by the X through that sector in FIGS. 7A–7C. In this example, sectors identified by the same identifier may store corresponding data. For example, sector A of disk 2 mirrors data stored to sector A of disk 1, and sector A of the backup device backs up data stored to sector A of disk 2. Corrupt data is shown by a "?".

In this embodiment, backups are not performed in real-time. As a result, data stored in a bad sector may be correct when the most recent backup is performed, and thus the data may be correct on the backup. Note that the data stored on the backup is correct as of the time at which the backup is performed, but may not indicate the most recent value of the data (e.g., at the time a corrupt sector is detected). Thus, the data on the backup, while correct, may not be the most current version of that data in the system. Since backups are not real-time, any errors on the disk(s) being backed up (here, disk 2) may be detected before the backup procedure is performed, reducing the chance that erroneous data will be recorded on the backup. If errors are detected, the erroneous data may be corrected, if possible (e.g., using error correcting code contained in a sector's trailer). If the data cannot be corrected, the data may be restored from a previous correct backup. If no previous backup is available, the data may be initialized to a default value (e.g., a value indicating that the no data has been written to the data's address). Thus, the data on the backup may be guaranteed to be correct. In FIG. 7A, sector I of disk 1 is a bad sector, and the data stored to sector I is corrupt. However, at the time the backup is performed, the data stored in sector I of disk 2 (which is the real-time mirror of sector I of disk 1) is correct, and thus the backup of sector I is correct.

In FIG. 7B, corrupt sector I is detected and remapped to Sector L by remapping sector I's address to sector L on disk 1. However, the data stored in sector I is not successfully copied to sector L. Since disk 2 is the real-time mirror of disk 1, the data stored in sector I on disk 2 may now also be corrupt. In response to detecting that sector I on disk 1 is a bad sector, remapping sector I to a sector L, and being unable to successfully copy the data to the new sector, sector L's address is added to the non-read list for disk 1.

The corresponding sector I on disk 2 may not be bad and thus may not be remapped. Sector I on disk 2 may continue to mirror data stored to sector I's address (which is now sector L's address on disk 1 because of the remapping). However, since disk 2 has been updated to reflect the corrupt data, the data stored at sector I on disk 2 is incorrect and cannot be used to correct the data stored on disk 1. Furthermore, the data stored at sector I on disk 2 should not be provided to applications that access sector L's address. Thus, the address of the remapped sector on disk 1 may, in some embodiments, be added to disk 2's non-read list as well, even though that address may not have actually been remapped on disk 2. Alternatively, the hardware and/or software controlling the real-time mirroring may be configured to inhibit reads to sector L's address on both disk 1 and disk 2 if that address is listed on disk 1's non-read list.

FIG. 7C shows how the data at sector L's address on both disk 1 (in sector L) and disk 2 (in sector I) may be restored from the backup disk. In one embodiment, the real-time mirroring controller may automatically update the data at sector I on disk 2 when the data at sector L on disk 1 is restored. In other embodiments, the data may be restored to both disks independently. When the data is restored to disk 1, sector L's address may be cleared from disk 1's non-read list. If sector L's address had been added to disk 2's non-read list, that address may be cleared from that non-read list when the data is restored to sector I of disk 2.

Figure 8:
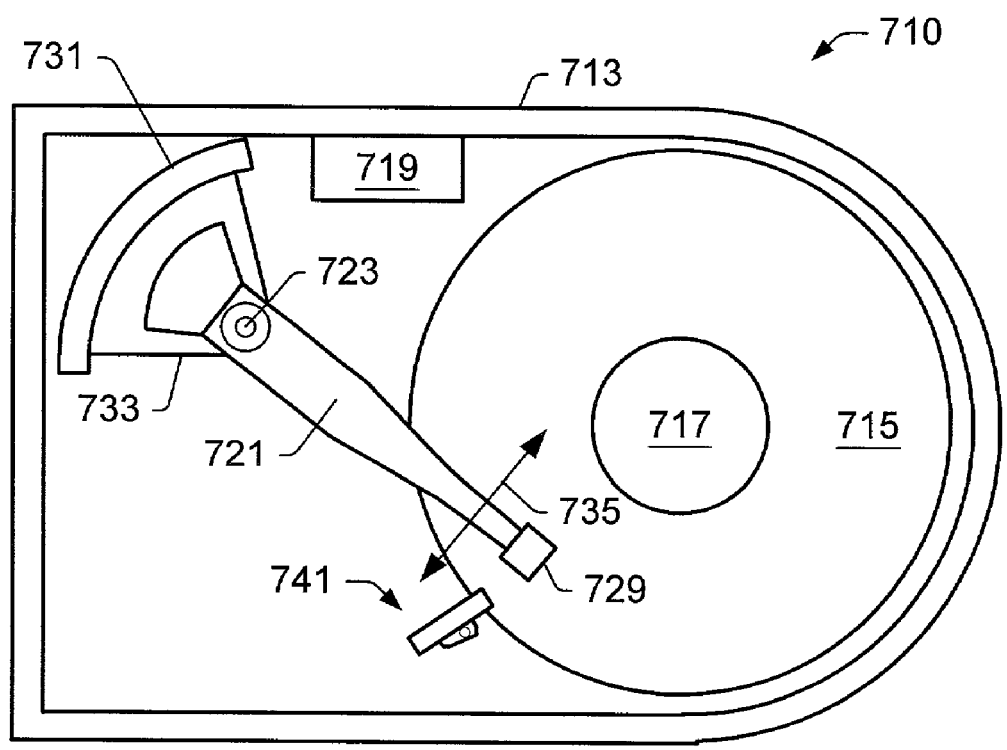
FIG. 8 illustrates one embodiment of a hard drive.

FIG. 8 shows one embodiment of a hard drive 700. The hard drive 700 is enclosed in an outer housing 713. The hard drive contains several stacked, parallel magnetic disks 715 (of which only the top disk is shown). Each magnetic disk 715 has two surfaces, and in some embodiments, each surface may be used to store data. A motor (not shown) may rotate disks 715 around a central drive hub 717. A plurality of stacked, parallel actuator arms 721 may be pivotally mounted to base 713 by a pivot assembly 723. In some embodiments, actuator arms 721 may be curved. A controller 719 may be mounted to the base and configured to selectively move arms 721 so that magnetic disks 715 can be accessed for read and write operations. The controller may also perform operations such as controlling the motor and making sure the motor runs at the correct speed, managing read/write operations, implementing power management features, handling geometry translation, managing an internal cache and prefetching data into the cache, reordering commands to access disks 715, converting data into different formats, etc.

In the embodiment shown, each arm 721 includes a head assembly 729 that has at least one magnetic read/write head for magnetically reading data from or magnetically writing data to disks 715. In some embodiments, the magnetic read/write heads may be ferrite, metal-in-gap, thin film, MR (Magnetoresistive), or GMR (Giant Magnetoresistive) heads (if MR or GMR heads are used, the read/write head may actually include different elements for reading and writing). A motor assembly 731, which may include a conventional voice coil motor, may be coupled to pivot assembly 723 opposite head assemblies 729. Movement of an actuator drive arm 733 moves head assemblies 729 radially across tracks on the disks 715 until the heads on assemblies 729 settle on the target tracks, as indicated by movement arrow 735. All of the head assemblies 729 are moved as a single unit.

Figure 9:
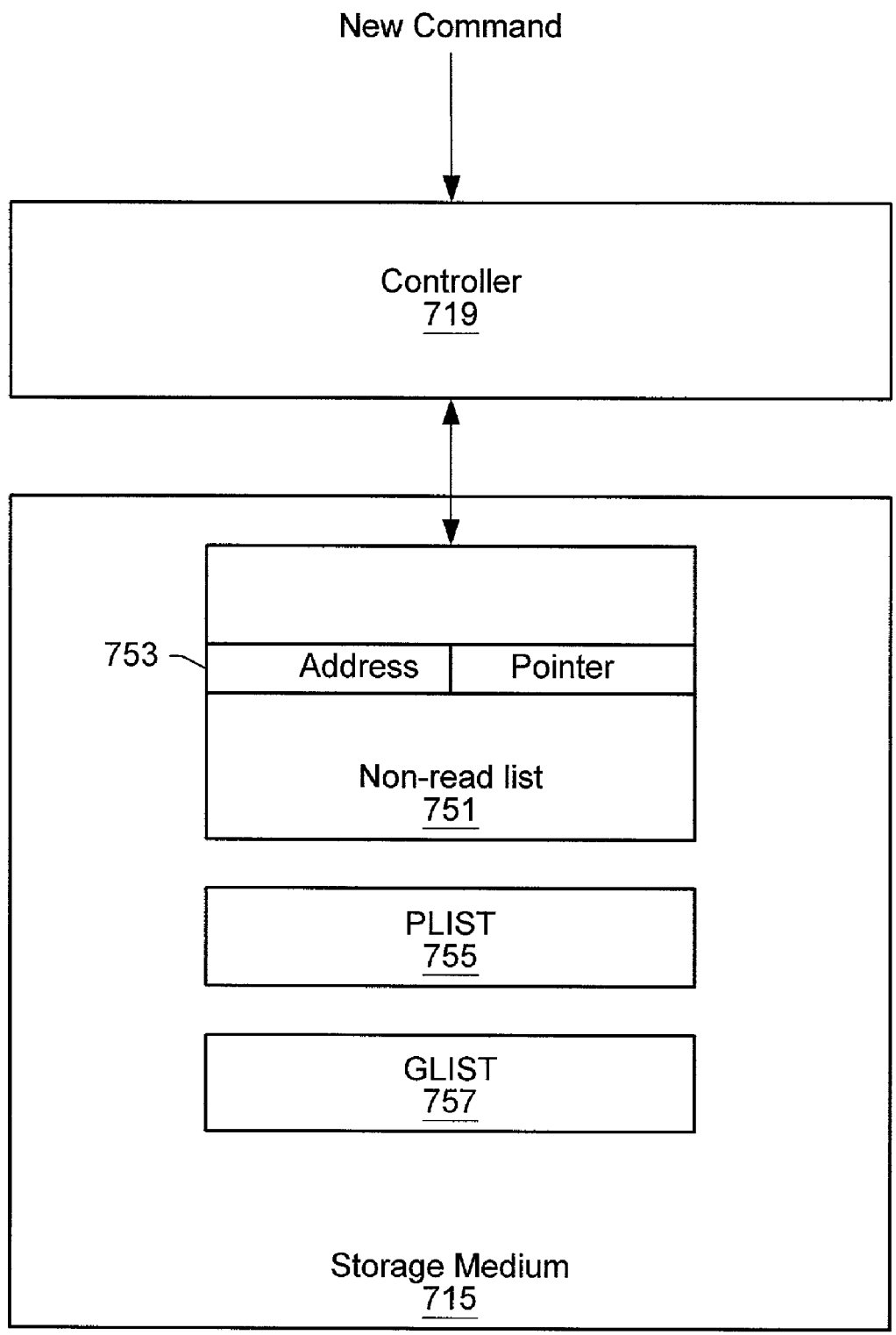
FIG. 9 is a block diagram of one embodiment of a hard drive.

FIG. 9 shows a functional block diagram of hard drive 700. In some embodiments, the controller 719 may be configured to manage the non-read list 751 for hard drive 700. The non-read list 751 is stored on storage medium 715 in this embodiment. The controller may maintain one or more pointers identifying where the non-read list is stored in on the storage medium 715. These pointers may be stored in a non-volatile memory included in controller 719 in one embodiment.

As FIG. 9 shows, in some embodiments, each entry 753 in the non-read list 751 may indicate the address of the data that is not guaranteed to be correct and a pointer to the next entry in the non-read list. Other information may also be included in some embodiments. Note that in other embodiments, a device driver running on a host system may manage the non-read list (as opposed to controller 719 in the disk drive). If hard drive 700 is a SCSI device, controller 719 or a device driver may be configured to maintain and use a PLIST 755 and/or a GLIST 757 in addition to maintaining and using the non-read list. For example, controller 710 may detect a bad sector and list that sector in the GLIST in one embodiment. Similar lists that track bad sectors and/or the sectors to which the bad sectors have been remapped may also be used in other embodiments. These lists may be used in conjunction with a non-read list.

In an alternative embodiment, a non-read list may be maintained by defining a non-read list field in the header information included in each sector (e.g., in the header of each sector) for each address that maps to that sector. The non-read list field may indicate whether or not that address is currently included in the non-read list. If the non-read list field indicates that the address is not currently included in the non-read list, reads to that address may proceed normally. If the non-read list field indicates that the address is currently included in the non-read list, however, reads to that address may be inhibited. Writes to the address may update the non-read list field to indicate that the address is no longer included in the non-read list.

While the above description often provides example embodiments in which the storage device being described is a hard drive, note that other embodiments may include a variety of other types of storage devices that have associated non-read lists similar to those described above.

Numerous variations and modifications will become apparent to those skilled in the art once the above disclosure is fully appreciated. It is intended that the following claims be interpreted to embrace all such variations and modifications.

What is claimed is:

1. A method of managing a non-read list associated with a storage medium, the method comprising:
    detecting a bad portion of the storage medium;
    in response to said detecting a bad portion, remapping an address of the bad portion to a new portion of the storage medium;
    copying the data stored to the bad portion to the new portion;
    if said copying is unsuccessful, adding the address of the new portion to the non-read list; and
    inhibiting a read to the new portion if the address of the new portion is listed on the non-read list.

2. The method of claim 1, further comprising not adding the address of the new portion to the non-read list if said copying is successful.

3. The method of claim 1, further comprising:
removing the address of the new portion from the non-read list in response to a successful write to the new portion.

4. The method of claim 3, further comprising restoring data to the new portion from a backup device, wherein the successful write occurs during said restoring.

5. The method of claim 1, wherein the storage medium comprises a hard disk platter, wherein the new portion is a first sector on the hard disk platter.

6. The method of claim 1, further comprising initiating a backup of the storage medium, wherein said initiating comprises:
determining whether any addresses of any portions of the storage medium are listed on the non-read list; and
in response to the address of new portion being listed on the non-read list, restoring data from a backup device to the new portion of the storage medium, wherein said restoring removes the address of the new portion from the non-read list.

7. The method of claim 6, wherein the storage medium is comprised in a group of mirrored storage media, wherein said restoring comprises restoring the data to one or more other storage media in the group of mirrored storage media.

8. The method of claim 1, further comprising:
detecting one or more read errors when attempting to read from the new portion of the storage medium;
in response to said detecting, restoring data to the new portion of the storage medium from a backup device, wherein said restoring removes the address of the new portion from the non-read list.

9. The method of claim 1, wherein the storage medium is comprised in a group of mirrored storage media, wherein said inhibiting comprises inhibiting the read from accessing the other mirrored storage media in the group.

10. The method of claim 1, further comprising listing the bad portion on a GLIST (Grown List) in response to said detecting.

11. The method of claim 1, wherein said inhibiting comprises returning an error indication.

12. A storage device comprising:
a storage medium comprising a plurality of portions, wherein each portion is identified by an address;
an access mechanism configured to access data stored on the storage medium;
a controller coupled to control the access mechanism, wherein the controller is configured to receive a command to access data at a first address and to responsively control the access mechanism to access a first portion of the storage medium;
wherein the controller is configured to inhibit read access to the first portion if the first portion's address is listed on a non-read list, wherein a given portion of said storage medium is listed on said non-read list in response to unsuccessfully copying data from a bad portion of said storage medium to said given portion;
wherein the controller is configured to remove the first portion's address from the non-read list in response to a successful write to the first portion.

13. The storage device of claim 12, wherein the non-read list is stored on the storage medium.

14. The storage device of claim 12, wherein the storage device is a hard drive, and wherein the first portion is a first sector of a hard disk platter.

15. The storage device of claim 12, wherein the controller is further configured to list a second portion of the storage medium's address on the non-read list if:

a third portion of the storage medium is detected to be a bad portion;
the third portion is remapped to the second portion; and
data stored to the third portion is unsuccessfully copied to the second portion.

16. The data processing system of claim 12, wherein the successful write restores data to the first portion from a backup device.

17. The data processing system of claim 12, wherein the controller is configured to generate an error indication in response to inhibiting read access to the first portion.

18. A data processing system comprising:
a host computer system including a memory and a processor;
a storage array coupled to the host computer system, wherein the storage array includes a plurality of storage devices, wherein a first storage device of the plurality of storage devices has a non-read list;
a controller coupled to manage the non-read list;
wherein an application program stored in the memory and executed by the processor is configured to generate a read command to read data from a first portion of a storage medium included in the first storage device;
wherein if an address of the first portion is listed on the non-read list, the controller is configured to inhibit performance of the read command, wherein the controller is configured to remove the address of the first portion from the non-read list in response to a successful write to the first portion, wherein a given portion of said storage medium is listed on said non-read list in response to unsuccessfully copying data from a bad portion of said storage medium to said given portion.

19. The data processing system of claim 18, wherein the controller is configured to generate an error indication in response to inhibiting performance of the read command.

20. The data processing system of claim 18, wherein the non-read list is stored on the storage medium.

21. The data processing system of claim 18, wherein the controller is included in a storage device controller included in the first storage device.

22. The data processing system of claim 18, wherein the controller is included in an array controller coupled between the host computer system and the storage array.

23. The data processing system of claim 18, wherein the controller is implemented in program instructions stored in the memory and executed by the processor.

24. The data processing system of claim 18, wherein the storage device is a hard drive, and wherein the first portion is a first sector of a hard disk platter.

25. The data processing system of claim 18, wherein the controller is further configured to add a second address of a third portion of the storage medium to the non-read list if:
a second portion of the storage medium is detected to be a bad portion;
the second address of the second portion is remapped to the third portion; and
data stored to the second portion is unsuccessfully copied to the third portion.

26. The data processing system of claim 18, wherein the successful write restores data to the first portion from a backup device.

27. The data processing system of claim 18, wherein the first storage device is included in a mirrored group of storage devices, wherein data stored on the first storage device is mirrored to other storage devices in the mirrored group, wherein the controller is configured to inhibit performance of the read command to any of the other storage devices in the mirrored group if the address of the first portion is listed on the non-read list.

28. The data processing system of claim 27, wherein the successful write restores data to each storage device in the mirrored group.

29. A system comprising:
 means for storing data;
 means for detecting that a first portion of the means for storing data cannot reliably store data;
 means for mapping the first portion of the means for storing data to a second portion of the means for storing data;
 means for listing the second portion on a non-read list if data stored to the first portion is not successfully copied to the second portion; and
 means for inhibiting read access to the second portion if the second portion is listed on the non-read list.

\* \* \* \* \*